Feb. 17, 1942.   F. W. SCHUMACHER ET AL   2,273,147
DECOLORIZATION OF MINERAL OILS
Filed Sept. 21, 1938
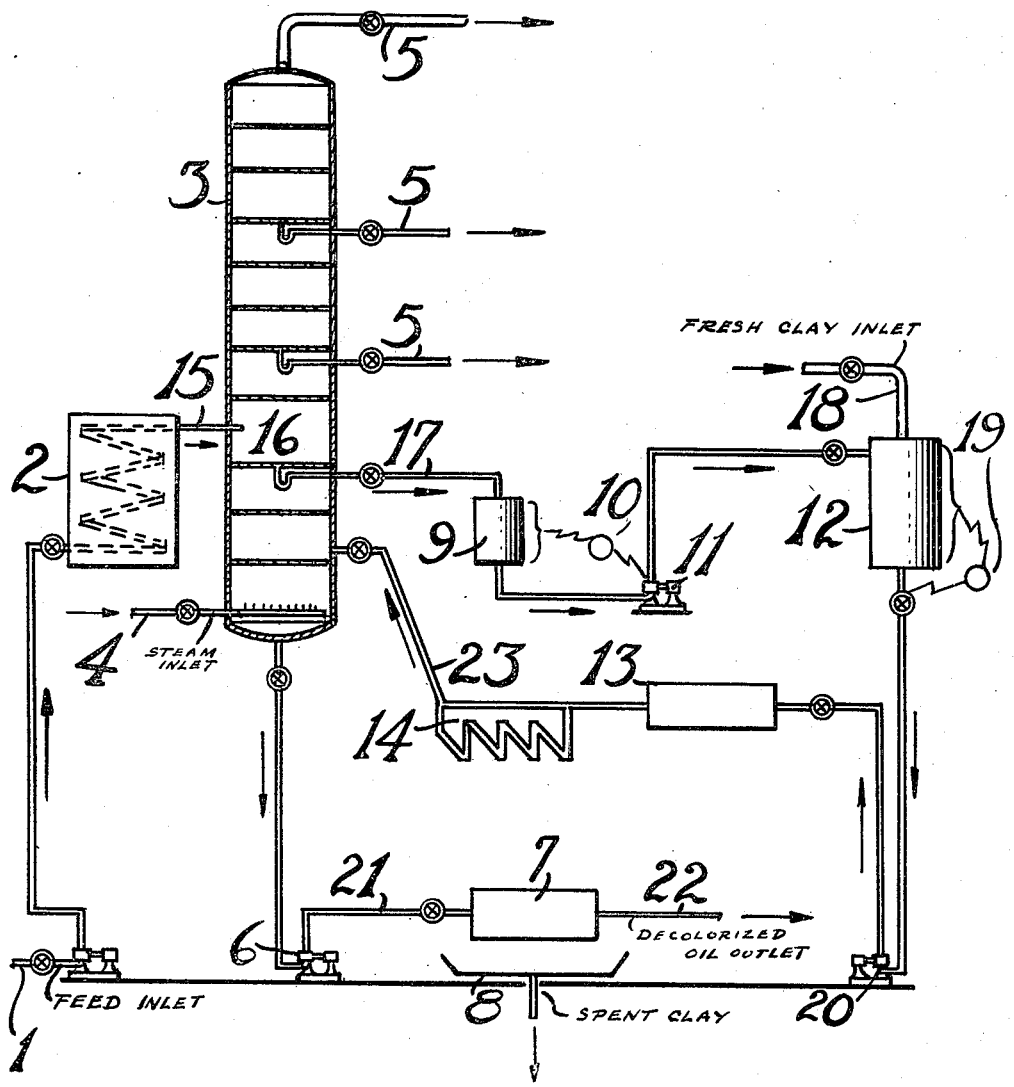
Frederick W. Schumacher  Inventors
Robert P. Ferguson
By _____ Attorney Patented Feb. 17, 1942

2,273,147

UNITED STATES PATENT OFFICE 2,273,147

DECOLORIZATION OF MINERAL OILS

Frederick W. Schumacher, Mountainside, and Robert P. Ferguson, Cranford, N. J., assignors to Standard Oil Development Company, a corporation of Delaware Application September 21, 1938, Serial No. 230,928

12 Claims. (Cl. 196—79)

The present invention relates to the treatment of mineral oils with clay. The invention especially relates to an improved process of contacting petroleum residual oils with decolorizing clays in an efficient and economical manner. The process of the present invention withdraws oil from a distilling tower, adds clay to the oil withdrawn and reintroduces the oil-clay slurry into the distilling tower at a point below that at which it was withdrawn.

It is well known in the art to decolorize petroleum oils, particularly residual oils, by various methods. One method of decolorizing a residual oil is to add the clay to the oil as it is withdrawn from the distilling tower followed by processing the same in conventional clay contacting equipment. Another process of decolorizing residual oils is to add the clay to the total feed to the distilling equipment. The clay is removed with the residual oil and is then separated from the oil by filtering or other suitable means. These processes, however, are not entirely satisfactory. For instance, when the clay is added to the residual product as it is withdrawn, additional heat is usually necessary to bring the temperature of the residual product up to the temperature at which the decolorizing clays have a maximum efficiency in removing coloring matter. This necessitates additional equipment and thus makes the operation rather expensive. The method of adding the clay to the total feed likewise has inherent disadvantages. For example, optimum decolorizing temperatures do not correspond with distilling temperatures, with the result that in many operations the clay and oil are in contact at relatively high temperatures above the optimum decolorizing temperature, thus causing excessive cracking and oil decomposition.

The process of our invention overcomes these unfavorable tendencies attendant with known decolorizing processes and secures an economical operation in which a fraction or any number of desirable fractions of the oil is contacted with clay under optimum operating conditions. In accordance with the present process, a fraction of oil is withdrawn from the distilling tower, clay is then added, and the oil-clay slurry is reintroduced in the distilling tower at a point below that from which it was withdrawn.

The process of our invention securing these desirable results may be readily understood by reference to the attached drawing showing one modification of the same.

Feed material by means of oil feed pump 1 is passed through furnace 2 and introduced by means of line 15 into distilling tower 3. For the purposes of illustration distilling tower 3 is taken as a conventional type distillation pipe still. The heated material is introduced into the flash zone 16 of tower 3. In this zone the lighter components vaporize and flow upwardly into the fractionating section of the tower containing conventional fractionating plates and bubble caps. Various distillate streams may be withdrawn by means of distillate draw-offs 5 from the fractionating section. The heavier constituents flow downwardly from the flash zone into the stripping section of tower 3 and contact a stripping medium, as for example, steam which is introduced by means of line 4. At a point below the flash zone, as for example, from the first plate below the flash zone, a portion of the residual oil is withdrawn by means of line 17 and passes into a surge tank 9. A liquid level control 10 and pump 11 are adapted to maintain the liquid level in surge tank 9. The liquid is withdrawn from surge tank 9 and pumped by means of pump 11 into receiving tank 12. In tank 12 an optimum amount of clay is injected by means of line 18. A liquid level control 19 and a pump 20 are adapted to maintain the correct level in clay tank 12. The oil-clay slurry is withdrawn from tank 12 and passed through mixer 13. After complete mixing of the clay and oil, the slurry is reintroduced into distilling tower 3 by means of line 23 at a point below the point at which the material was withdrawn, as for example, on the third plate below the flash zone. If desirable, the clay slurry prior to its reintroduction into distilling tower 3 may be heated to a preferred decolorizing temperature by means of furnace 14. The residual oil containing the clay is withdrawn from tower 3 by means of pump 6 and line 21 and passed through filter 7, in which equipment the decolorized oil is separated from the spent clay. The decolorized oil is withdrawn from filter 7 by means of line 22 and the spent clay by means of equipment 8.

The process of the present invention may vary widely. Although it is particularly adapted to the treatment of heavy residual oils in a pipe still operation, it may be widely applied to other processes. For example, it is within the scope of the present invention to withdraw oil from any section of a distilling tower and to add clay to the same, followed by reintroducing the oil-clay slurry into the tower at a point below which it was withdrawn. It is also within the scope of the invention to withdraw oil from several sections of the tower and to treat the particular oil fractions withdrawn with the optimum amount of clay at optimum temperatures.

The process, however, is particularly applicable for the decolorizing of residual oils. The residual oils are preferably withdrawn from the tower at a point below the feed inlet. The particular section from which the residual oils are withdrawn will depend upon the oil being treated, the type of decolorizing clay used and the temperatures maintained in the tower. The oil is withdrawn at a point at which the temperature of the oil is optimum for securing maximum decolorization of the oil.

The process of the present invention is especially adapted for clay treating residual oils in which it is necessary to introduce the feed stock into the flash zone of a distilling tower at a temperature above about 700° F. In this type of operation the lighter overhead fraction need not be subjected to the action of clay, thus eliminating any possible decomposition of the overhead fraction due to its contact with clay. The residual oil is then withdrawn from a point below the feed inlet and clay added to the same. The oil-clay slurry is then introduced into the tower at a point below the point at which the oil was withdrawn and at which reintroduction point the temperature is below the temperature at which appreciable decomposition of the oil occurs.

The process also may be adapted to the treatment of feed stocks containing an appreciable amount of lower boiling solvents. Under these conditions it is usually desirable to remove the solvents at relatively low temperatures. The solvent thus could be removed from the the residual oil in the flash zone. The oil is then withdrawn in the manner described and clay added to the same. The oil-clay slurry prior to its reintroduction into the distilling tower is then brought up to an optimum clay contacting temperature by means of heater 14.

The particular clay used may be any suitable decolorizing clay, as for example, finely divided fuller's earth, such as Attapulgus and Floridin clays or acid activated clays such as Super Filtrol. The amount of clay used per volume of oil will also depend upon the particular clay being used, as well as upon the oil being treated and the conditions under which it is treated. In general, it is preferred to treat oils with from 0.1 to 2 lbs. of clay per gallon of oil at a temperature of from 300 to 700° F.

The amount of oil withdrawn from the distilling tower for mixing with clay will depend upon the particular oil being treated, the type of clay being used, and the conditions under which it is desired to contact the clay and oil. In general, when decolorizing mineral oils from 20 to 100% of the residual oil may be withdrawn from the tower in order to form a clay slurry. However, in usual processes it is desirable to withdraw from about 20 to 60% of oil based upon the total volume of residual oil.

In order to further illustrate the present invention, the following examples are given showing the application of the present invention as applied to the processing of Pennsylvania crude for a bright stock product.

EXAMPLE 1

The total crude was stripped of the lighter fractions by means of an atmospheric distillation operation. The inspections of the reduced crude feed to the pipe still were as follows:

TABLE 1

*Charge stock (41% residuum of total crude)*

| | |
|---|---|
| Gravity, °A. P. I. | 31.6 |
| Flash, °F | 355 |
| Vis. at 210, S. S. U | 51 |

The temperature of the material upon leaving furnace 2 was about 690° F. The pressure in the flash zone of distillation tower 3 was about 24 mm. of mercury absolute, while the pressure at the top of tower 3 was about 8 mm. of mercury absolute. The lighter fractions were flashed and passed upwardly through the tower, resulting in the following distillate:

TABLE 2

*Distillate*

| | |
|---|---|
| Yield on reduced crude, per cent | 63 |
| Gravity, °A. P. I. | 35.0 |
| Vis. at 100° F., S. S. U | 77 |

From the first plate below the flash zone approximately 50% of the residual oil was withdrawn at a temperature of about 650° F. This material was passed through clay addition tank 12, at which point 0.46 lb. of Super Filtrol clay were added per gallon of reduced crude fed into the still. After addition of the clay, the mixture was thoroughly mixed in mixer 13 and passed through furnace 14 and then introduced on the second plate below the flash zone in tower 3 at a temperature of about 670° F. Steam was introduced by means of line 4 and the residual oil-clay slurry withdrawn at a temperature of 660° F. The clay was separated from the residual oil in clay separator 7.

A second operation was conducted on the reduced crude as described above with the exception that no clay was added in the distilling operation. The residual oil after withdrawal from the still was contacted at 525° F. in the conventional manner using 1.8 lbs. of Super Filtrol clay per gallon of residuum.

The decolorized residua from the two operations after removal of the clay had the following inspections:

TABLE 3

| | Conventional contact at 525° F. | Clay injection below flash chamber during distillation |
|---|---|---|
| Residuum (after clay removal) | | |
| Yield on reduced crude, percent | 30 | 32 |
| Gravity, ° A. P. I | 27.5 | 27.6 |
| Flash, ° F | 545 | 535 |
| Vis. at 210° F., S. S. U | 140 | 137 |
| Lbs. of super filtrol/gal. of reduced crude | 0.67 | 0.46 |
| Color—Robinson | ¾ | ¾ |

From the above data it may be seen that for the same color a higher yield was obtained by the process of the present invention over the conventional contacting process, and that approximately a 30% clay saving was also secured.

EXAMPLE 2

A Pennsylvania cylinder stock was decolorized at various contacting temperatures using the same amount of Super Filtrol clay.

The results of the various operations were as follows:

TABLE 4

*Decolorization of mineral oils contacting of Pennsylvania A cylinder stock*

| Contacting temp., ° F. | Super filtrol, lbs./gal. | Percent total oil loss | Viscosity at 210° F. S. S. U. | Color* (T. R.) |
|---|---|---|---|---|
| 400 | 0.75 | 6.8 | 145.2 | 1.0 |
| 500 | 0.75 | 8.2 | 143.6 | 1.75 |
| 600 | 0.75 | 9.4 | 141.8 | 2.25 |
| 700 | 0.75 | 10.4 | 132.0 | 3.00 |

*Determined in dilution with 85 parts of +30 Saybolt color naphtha and 15 parts of decolorized oil.

From the above data it will be noted that as the contacting temperature increases the extent of the decolorization, obtained with a given amount of clay, increases, but at the same time the amount of decomposition prohibitively increases as evidenced by increase in oil loss and decrease in viscosity. It is evident therefore that there are critical conditions under which a high degree of decolorization is obtained without excessive decomposition.

The present invention is not to be limited by any theory or mode of operation, but only by the following claims in which it is desired to claim all novelty in so far as the prior art permits.

We claim:

1. Process of decolorizing petroleum oils in a distillation tower comprising withdrawing constituents of the oil from a point below the feed inlet to the tower, forming a clay slurry with the fraction withdrawn, then reintroducing said slurry into said distillation tower at a point below the point at which said constituents were withdrawn.

2. Process for securing improved petroleum oils comprising introducing reduced crude into a vacuum distillation tower, separating the relatively low boiling constituents and removing the same overhead, removing from the distillation tower a portion of the residual oil, forming a clay slurry with the same, reintroducing said slurry into said distillation tower at a point below the point at which the constituents were removed and at a substantial distance above the bottom of the tower, withdrawing the total residual oil and slurry from the bottom of said distillation tower, and separating the clay therefrom.

3. Process in accordance with claim 2 in which said portion of the residual oil is removed from said distillation tower at a point below the feed inlet.

4. Process in accordance with claim 2 in which said portion of the residual oil is removed from said distillation tower at a point below the feed inlet and in which said clay slurry is heated prior to reintroduction into said distillation tower.

5. Process of treating a petroleum oil in a distilling operation in which the petroleum oil is introduced into the mid-section of a distilling tower and relatively higher boiling constituents are separated from relatively lower boiling constituents of said petroleum oil, the step which comprises withdrawing relatively higher boiling constituents from said distilling tower at a point below the feed inlet, forming a clay slurry with said high boiling constituents, and reintroducing said clay slurry into said distilling tower at a point below the point at which the relatively higher boiling constituents were withdrawn.

6. Process of treating a petroleum oil in a distilling operation in which the petroleum oil is introduced into the mid-section of a distilling tower and relatively higher boiling constituents are separated from relatively lower boiling constituents of said petroleum oil, the step which comprises withdrawing relatively higher boiling constituents from said distilling tower at a point below the feed inlet, at a temperature at which optimum results are secured for the removal of color bodies by clay from said oil with a minimum amount of decomposition, forming a clay slurry with said relatively higher boiling constituents, and reintroducing said slurry into said distilling tower at a point below the point at which said relatively higher boiling constituents were withdrawn.

7. Process of treating a petroleum oil in a distilling operation in which the petroleum oil is introduced into the mid-section of a distilling tower and relatively higher boiling constituents are separated from relatively lower boiling constituents of said petroleum oil, the step which comprises withdrawing relatively higher boiling constituents from said distilling tower at a point below the feed inlet, at a temperature in the range at which maximum efficiency is secured for the removal of color bodies from said oil by means of clay, forming a clay slurry with said relatively higher boiling constituents, heating said clay slurry to a pre-determined optimum temperature for the removal of color bodies by means of clay from said oil, and reintroducing said clay slurry into said distilling tower at a point below the point at which the relatively higher boiling constituents were withdrawn.

8. Process of treating a petroleum oil in a distilling operation in which the petroleum oil is introduced into a flash zone of a distilling tower and the relatively higher boiling constituents are separated from the relatively lower boiling constituents of said petroleum oil, the step which comprises withdrawing relatively higher boiling constituents from said tower from a point below the flash zone, forming a clay slurry with said higher boiling constituents, reintroducing said slurry into said tower at a point below that at which the relatively higher boiling constituents were withdrawn and at a substantial distance above the bottom of the tower.

9. Improved process of decolorizing petroleum oil in a crude flash distilling operation comprising introducing the crude into the flash zone of a distilling tower, separating the relatively lower boiling constituents from the residual oil, withdrawing residual oil from said flash distilling tower at a point below the flash zone, forming a clay slurry with the residual oil, reintroducing said slurry into said tower at a point below the point at which residual oil was withdrawn and at a substantial distance above the bottom of the tower, removing the total residual oil with the clay slurry from the bottom of said distilling tower and separating the clay therefrom.

10. Improved process of removing color bodies from petroleum oils by means of clay whereby a maximum clay efficiency is secured and a minimum decomposition of the petroleum oil results, comprising introducing the petroleum oil into a flash distilling tower, separating clay decomposable lower boiling constituents overhead, withdrawing relatively high boiling constituents containing color bodies from the flash distilling tower at a point below the flash zone of said tower, forming a clay slurry with the portion withdrawn, and reintroducing said slurry into said flash distilling tower at a point below the point at which said relatively high boiling constituents were withdrawn and at a substantial distance above the bottom of the tower.

11. Improved process of decolorizing petroleum oil in a crude flash distilling operation comprising introducing the crude into the flash zone of a distilling tower, separating the relatively lower boiling constituents from the residual oil, withdrawing from 20 to 60% of the residual oil from said flash distillation tower at a point below the flash zone, forming a clay slurry with the residual oil, reintroducing said slurry into said tower at a point below the point at which the residual oil was withdrawn and at a substantial distance above the bottom of the tower, removing the total residual oil with the clay slurry from the bottom of said distilling tower and separating the clay therefrom.

12. Improved process of removing color bodies from petroleum oils by means of clay whereby a maximum clay efficiency is secured and a minimum decomposition of a petroleum oil results, comprising heating the petroleum oil to a temperature of above about 700° F., introducing the heated oil into the flash zone of a flash distilling tower, separating the relatively lower boiling constituents from the oil, withdrawing residual oil at a temperature in the range from 300 to 650° F. from said flash distilling tower at a point below the flash zone, forming a clay slurry with the residual oil, reintroducing said slurry into said tower at a point below the point at which residual oil was withdrawn and at a substantial distance above the bottom of the tower, removing the total residual oil with the clay slurry from the bottom of said flash distilling tower and separating the clay therefrom.

FREDERICK W. SCHUMACHER.
ROBERT P. FERGUSON.